United States Patent
Davis et al.

(10) Patent No.: US 11,470,196 B2
(45) Date of Patent: Oct. 11, 2022

(54) SYSTEM AND METHOD FOR AUTOMATIC INDICATION OF CONTACT CENTER STATUS USING AN ILLUMINATION DEVICE

(71) Applicant: TELEPERFORMANCE SE, Paris (FR)

(72) Inventors: Evan Davis, Santaquin, UT (US); Lyle Hardy, Holladay, UT (US)

(73) Assignee: Teleperformance SE, Paris (FR)

( * ) Notice: Subject to any disclaimer, the term of this patent is extended or adjusted under 35 U.S.C. 154(b) by 313 days.

(21) Appl. No.: 16/655,051

(22) Filed: Oct. 16, 2019

(65) Prior Publication Data

US 2020/0128129 A1 Apr. 23, 2020

Related U.S. Application Data

(60) Provisional application No. 62/747,604, filed on Oct. 18, 2018.

(51) Int. Cl.
*H04M 3/00* (2006.01)
*H04M 3/51* (2006.01)

(52) U.S. Cl.
CPC ....... *H04M 3/5133* (2013.01); *H04M 3/5175* (2013.01); *H04M 3/5191* (2013.01)

(58) Field of Classification Search
CPC ............. H04M 3/5133; H04M 3/5191; H04M 3/5175; G08B 21/18; G08B 5/36; G06F 11/3013; G06F 11/3055; G06F 11/325; G06F 11/328; G06Q 30/016
See application file for complete search history.

(56) References Cited

U.S. PATENT DOCUMENTS

| | | | |
|---|---|---|---|
| 2003/0046142 A1* | 3/2003 | Eitel | G06Q 10/06398 705/7.42 |
| 2009/0213573 A1* | 8/2009 | Furukawa | F21V 19/0045 362/97.1 |
| 2017/0163725 A1 | 6/2017 | Chadaga | |

OTHER PUBLICATIONS

Anonymous, "USB Signal Tower/ LR6-USB| PATLITE", Jun. 2, 2018, XP055653779, Retrieved from the Internet: URL: https://web.archieve.org/web/20180602231335/https://www.patlite.com/product/detail0000000689.html (retrieved on Dec. 18, 2019) p. 1, paragraph 2-p. 2, paragraph 1.

* cited by examiner

*Primary Examiner* — Rasha S Al Aubaidi

(57) ABSTRACT

Embodiments of the present invention provide systems and methods for automatically controlling an electronic illumination device to indicate information pertaining to workstations or agents of a customer contact center. Some embodiments are useful in the context of employee management because the illumination devices are used to indicate information about tasks that employees are engaged in, the performance of the employees, and the status of the employees. A computer system coupled to the illumination device executes control software configured to send control signals over a communication interface, such as USB or Bluetooth. The data sent to the electronic illumination device can cause the illumination device to turn off or on, change color, blink, strobe, etc., for producing desired lighting effects representative of a status or event associated with an employee or workstation.

19 Claims, 10 Drawing Sheets

| Status 405 | Color 410 | Effect 415 |
|---|---|---|
| Hand Raised | Red | Solid |
| Help Coming | Yellow | Solid |
| Problem Solved | - | Turn Off |
| Station Available | Green | Solid |
| Station Occupied | - | Turn Off |
| Station Locked | Green | Blink |

| Status<br>605 | Condition<br>610 | Effect<br>615 |
|---|---|---|
| Number of Calls Handled | Most Calls Handled | Orange Strobe |
| Call Resolution | First Agent to Resolve a Call | Rainbow Gradient |
| Customer Satisfaction | Highest Rating | Blue Strobe |

SYSTEM AND METHOD FOR AUTOMATIC INDICATION OF CONTACT CENTER STATUS USING AN ILLUMINATION DEVICE

CROSS-REFERENCE TO RELATED APPLICATIONS

The present application claims priority to provisional application Ser. No. 62/747,604, filed on Oct. 18, 2018, entitled "USE USB-RGB LIGHT DISPLAY CONNECTED TO CONTACT CENTER AGENT COMPUTER TO INDICATE AT-A-GLANCE A VARIETY OF INFORMATION" and naming the same inventors as in the present application. The contents of the above referenced provisional application are incorporated by reference, the same as if fully set forth herein.

FIELD

Embodiments of the present invention generally relate to computer-controlled illumination devices. More specifically, embodiments of the present invention relate to computer-implemented systems and methods for automatically controlling an illumination device in order to convey information at a glance.

BACKGROUND

Customer contact centers or service centers typically employ a relatively large number of employees (agents) working in a common area or floor overseen by a floor manager or supervisor. The agents select an available workstation to at which to work for receiving customer inquiries and for assisting the customers to solve the inquiries by phone, email, or electronic chat, for example. In some cases it may be difficult for an agent to determine which stations are available or which stations are occupied by agents that are temporarily away from the station, such as when an employee is taking a short break. Once the agent is working at a station, if the agent is having difficulty in assisting the customer to solve the customer's inquiry, the agent will stand up and raise their hand to indicate that they need assistance from the floor supervisor. The status of an agent that is requesting assistance is often referred to as a "hand raised". In the best-case scenario, the floor supervisor quickly responds to the agent's request for assistance, but often times several agents require assistance in a short time frame, and an agent may have to wait five or more minutes before they begin to receive assistance.

The requirement for an agent to physically stand up and raise their hand to receive assistance is often inefficient because the agent must stop working and cannot access or reference a knowledgebase, product manual, customer account, etc., while they wait to receive assistance. Moreover, the floor supervisor may have difficulty determining the order in which the agents requested assistance, or how long an agent has been waiting for assistance, etc., and determining which agent should receive assistance next. Furthermore, a floor supervisor may have to access a software program to determine information (e.g., metrics) related to agent status or performance, for example, which takes the supervisor's attention away from observing the agents on the floor in real-time.

What is needed is a method and device that enables a supervisor to easily obtain information pertaining to the agents working on a contact center floor at-a-glance so that the supervisor can efficiently manage the agents of the contact center.

SUMMARY

Embodiments of the present invention provide systems and methods for automatically controlling an electronic illumination device to indicate information pertaining to workstations or agents of a customer contact center. Embodiments of the present invention are useful in the context of employee management because the electronic illumination device is used to indicate information about tasks that employees are engaged in, the performance of the employees, and the status of the employees. A computer system coupled to the electronic illumination device executes control software configured to send control signals over a communication interface, such as USB or Bluetooth. The data sent to the illumination device can cause the illumination device to turn off or on, change color, blink, strobe, etc., for producing desired visual effect representative of a status or event associated with an employee or workstation. By scanning across the contact center floor, the supervisor can obtain a rapid visual inspection of the types of questions, assistances, or status that are applicable to the agents on the floor.

According to one embodiment, an electronic device including an electrical and physical interface operable to be coupled to a port of a computer system is disclosed, where the computer system includes a processor, a rod-shaped casing housing the interface, a circuit board including circuitry housed within the casing, where the circuitry receives control signals from the computer system over the interface and controls an illumination element, and the illumination element disposed on one end of the rod shaped-casing and operable to produce a color that corresponds to a real-time status associated with the computer system, where the real-time status is determined by the processor and information read by the processor from the computer system.

According to some embodiments the computer system receives an information request from a remote monitor over a network interface, where the computer system obtains the real-time status responsive to the information request, and where further the circuitry controls the illumination element responsive to the information request.

According to some embodiments the computer system receives a light configuration from the remote monitor, and where the computer system sends control signals to the circuitry to control the illumination element based on the light configuration.

According to some embodiments the light configuration includes at least one of a status threshold and a performance threshold.

According to some embodiments the real-time status represents a time duration of an agent logged into the computer system.

According to some embodiments the real-time status represents an agent requesting assistance.

According to some embodiments the real-time status represents a working time of an agent using the computer system.

According to some embodiments the real-time status represents an agent using the computer system, and where the agent is logged in to the computer system but not working on the computer system.

According to some embodiments the real-time status represents a software program executed by the computer system.

According to some embodiments the illumination element rapidly changes the color to produce a lighting effect corresponding to the real-time status.

According to another embodiment, a method of monitoring contact center status among a plurality of agents of a contact center is disclosed. The method includes a remote monitor sending an information request to agent computer systems of the contact center, where the contact center includes the plurality of agents, and where the agent computer systems include a processor, a communication port, and an electronic illumination device, responsive to receiving the information request, the agent computer systems of the plurality of agents determining real-time status information, and electronic illumination devices of the agent computer systems illuminating respective colors representative of respective real-time status information determined by the associated agent computer systems. Each electronic illumination device includes an electrical and physical interface operable to be coupled a communication port of the associated agent computer system, a rod-shaped casing housing the electrical and physical interface, a circuit board including circuitry housed within the casing, where the circuitry receives control signals from the associated agent computer system over the interface and controls an illumination element, and the illumination element disposed on one end of the rod shaped-casing and operable to produce the respective colors representative of the real-time status information, where the real-time status information is determined by the processor and information read by the processor from the agent computer systems.

According to some embodiments the real-time status information includes tasks currently performed by each agent.

According to some embodiments the real-time status information includes an identity of a first agent, where the first agent has a highest performance level based on a prescribed metric.

According to some embodiments the real-time status information includes productivity information for the agents.

According to a different embodiment, a method of monitoring contact center status among a plurality of agents is disclosed. The method includes determining real-time status of agent computer systems associated with the plurality of agents, where the agent computer systems include a processor and a communication port, and based on the real-time status read from a light configuration to determine lighting effects that correspond to the real-time status, causing electronic illumination devices associated with the agent computer systems to produce the lighting effects reflective of the real-time status, where each electronic illumination device includes an electrical and physical interface operable to be coupled to a communication port of an agent computer system, a rod-shaped casing housing the interface, a circuit board including circuitry housed within the casing, where the circuitry receives control signals from the agent computer system over the interface and controls an illumination element, where the illumination element is disposed on one end of the rod shaped-casing and operable to produce lighting effects that correspond to the real-time statuses associated with the agent computer system.

According to some embodiments the real-time statuses indicate if a respective agent has requested assistance.

According to some embodiments the method includes the electronic devices illuminating a new color when a respective agent no longer requires assistance.

According to some embodiments the agent computer systems further include a network interface, and further includes the agent computer systems sending the real-time statuses to a remote monitor system using the network interface.

According to some embodiments the remote monitor selects a first agent of the plurality of agents to receive assistance.

According to some embodiments a respective electronic illumination device associated with the first agent changes color responsive to being selected by the supervisor computer system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
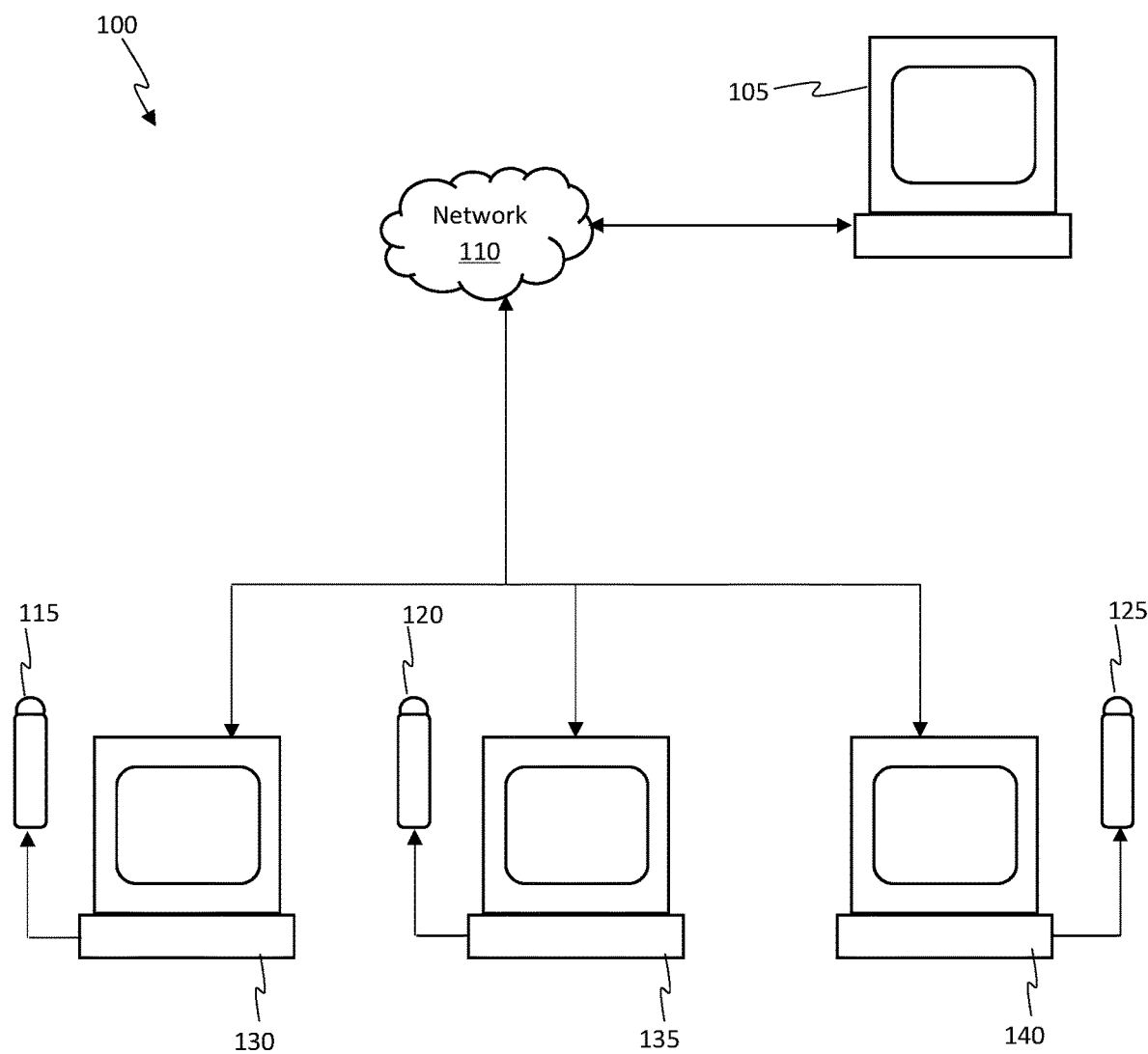
FIG. 1A depicts an exemplary computer system for automatically controlling illumination devices to indicate information associated with agents and/or workstations of a contact center according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 7 and 8) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

System and Method for Automatic Indication of Agent Status Using an Illumination Device Embodiments of the present invention provide systems and methods for automatically controlling an electronic illumination device to indicate information pertaining to workstations or agents of a customer contact center. Some embodiments are useful in the context of employee management because the illumination devices are used to indicate information about tasks that employees are engaged in, the performance of the employees, and the status of the employees. A computer system coupled to the illumination device executes control software configured to send control signals over a communication interface, such as USB or Bluetooth. The data sent to the electronic illumination device can cause the illumination device to turn off or on, change color, blink, strobe, etc., for producing desired lighting effects representative of a real-time status or event associated with an employee or workstation. According to some embodiments, the data includes an information request sent from a supervisor computer system to agent computer system. The information request can be concerning performance or productivity metrics of an agent, the current status of the agent, the availability of a workstation, etc. By scanning across the contact center floor, the supervisor can obtain a rapid visual inspection of the types of questions, assistances, or status that are applicable to the agents on the floor.

With regard to FIG. 1A, an exemplary computer system 100 for automatically controlling electronic illumination (e.g., LED) devices 115, 120, and 125 to indicate information associated with agents and/or workstations of a contact center is depicted according to embodiments of the present invention. The computer system 100 includes a supervisor computer system 105 connected to one or more agent computer systems 130, 135, and 140 over a computer network 110. Computer network 110 facilitates communication between the computer systems over a wired or wireless connection, and may include a local area network, a wireless network or the Internet. According to some embodiments, the electronic illumination devices 115, 120, and 125 have a rod or stick shape and are disposed in a vertical orientation above or next to the agent computer systems 130, 135, and 140 in a fashion that the illumination devices can be visualized by a supervisor or manager on the floor of the center.

The agent computer systems 130, 135, and 140 can be used in a contact center for facilitating agent communications with customers and for solving customer service issues. For example, a customer can call an agent or chat with an agent to describe a customer service issue, and the agent can use their respective computer system to respond to the customer and access customer service information such as information regarding the customer's account, knowledgebases, manuals, etc. The supervisor computer system or monitor system 105 is in communication with the agent computers systems 130, 135, and 140 for interfacing with the agents and for obtaining data from the agent computer systems such as agent status, inquiry status, an agent requesting assistance ("hand raised"), and performance/productivity metrics. For example, the supervisor computer system 105 can execute software that displays a list of all agents in the contact center, including the status of the agents, such as which agents have requested help, which agents are currently being helped, performance metrics of the agents, how long an agent has been working, etc.

In one example, the agent computer system 130 causes illumination device 115 to turn a particular color (e.g., red) to indicate that the agent working at computer system 130 has requested assistance. The agent computer system 130 also sends information to supervisor computer system 105 over network 110 to indicate that the agent has requested assistance, and the request for assistance can be displayed on a graphical user interface rendered on a display device of the supervisor computer system 105. The supervisor can select or acknowledge the agent's request for assistance using the graphical user interface, and a control signal is sent from the supervisor computer system 105 to the agent computer system 130 over network 110 to cause the illumination device 115 to turn yellow, for example, to indicate that help is on the way.

Once the agent has received assistance, either the agent computer system 130 or the agent computer system 105 can be used to indicate that assistance is no longer required, and the illumination device 115 stops emitting light. According to some embodiments, an information request is sent from supervisor computer system 105 to agent the computer systems 130, 135, and/or 140. The information request can be concerning performance metrics of an agent, the current status of the agent, the availability of a workstation, etc. In response, real-time information is obtained from agent computer system systems 130, 135, and/or 140 to satisfy the request, and the illumination devices 115, 120, and/or 125 to turn on or change colors according to the real-time information. Based on the color and/or effect produced by the electronic illumination devices 115, 120, and/or 125, real-time status information of agents on the floor is conveniently and efficiently obtained in response to the manager viewing the illuminated electronic devices 145B-197B without having to access a separate device or user interface.

Figure 1B:
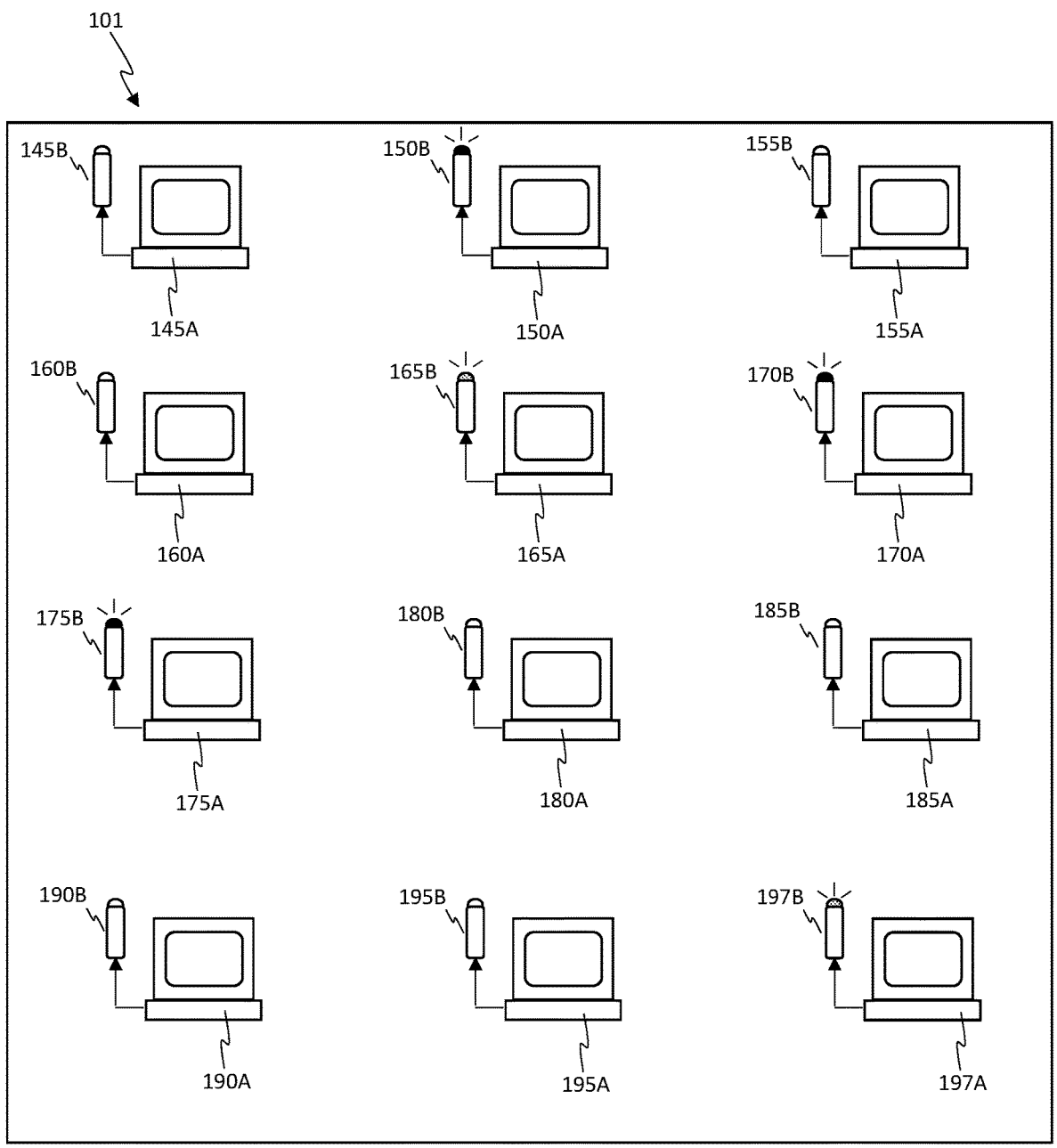
FIG. 1B depicts an exemplary customer contact center including agent computer systems in communication with respective illumination devices for conveniently indicating information to a floor supervisor according to embodiments of the present invention.

With regard to FIG. 1B, an exemplary customer contact center 101 including agent computer systems 145A-197A in communication with illumination devices 145B-197B for conveniently indicating information to a floor supervisor according to embodiments of the present invention. The agent computer systems may be connected to a network or communication system for communicating with a supervisor system as depicted in FIG. 1A. The supervisor computer system or monitor system is in communication with the agent computers systems 145A-197A for interfacing with the agents and for obtaining data from the agent computer systems such as agent status, inquiry status, an agent requesting assistance ("hand raised"), and performance metrics. Moreover, an information request can be sent to agent the computer systems 145A-197A, and the illumination devices 145B-197B turn on or change colors in real-time according to the criteria of the information request.

As depicted in FIG. 1B, the agent computer systems 150A, 170A, and 175A meet the criteria of an information request and therefore illumination devices 150B, 170B, and 175B illuminate using a first color or effect. For example, the supervisor computers system can issue an information request that includes illuminating the illumination devices of agent computer systems that are browsing a social media website, and illumination devices 150B, 170B, and 175B illuminate using the first color or effect to indicate that the agents using agent computer systems 150A, 170A, and 175A are browsing social media websites and therefore meet the criteria of the information request.

The agent computer systems 165A and 197A meet the criteria of a second information request and therefore illumination devices 165B and 197B illuminate using a second color or effect. For example, the supervisor computers system can issue an information request that includes illuminating the illumination devices of agent computer systems that have been idle for more than 10 minutes, and illumination devices 165B and 197B illuminate using the second color or effect to indicate that agent computer systems 165A and 197A have been idle for more than 10 minutes and therefore meet the criteria of the information request. Based on the color and/or effect produced by the electronic illumination devices 145B-197B, real-time status information across the contact center 101 is conveniently and efficiently obtained in response to the supervisor viewing the illuminated electronic devices 145B-197B without having to access a separate device or user interface. Other information requests can be based on performance/productivity metrics or thresholds, workstation status, what application is being executed by the workstation, etc.

Figure 2:
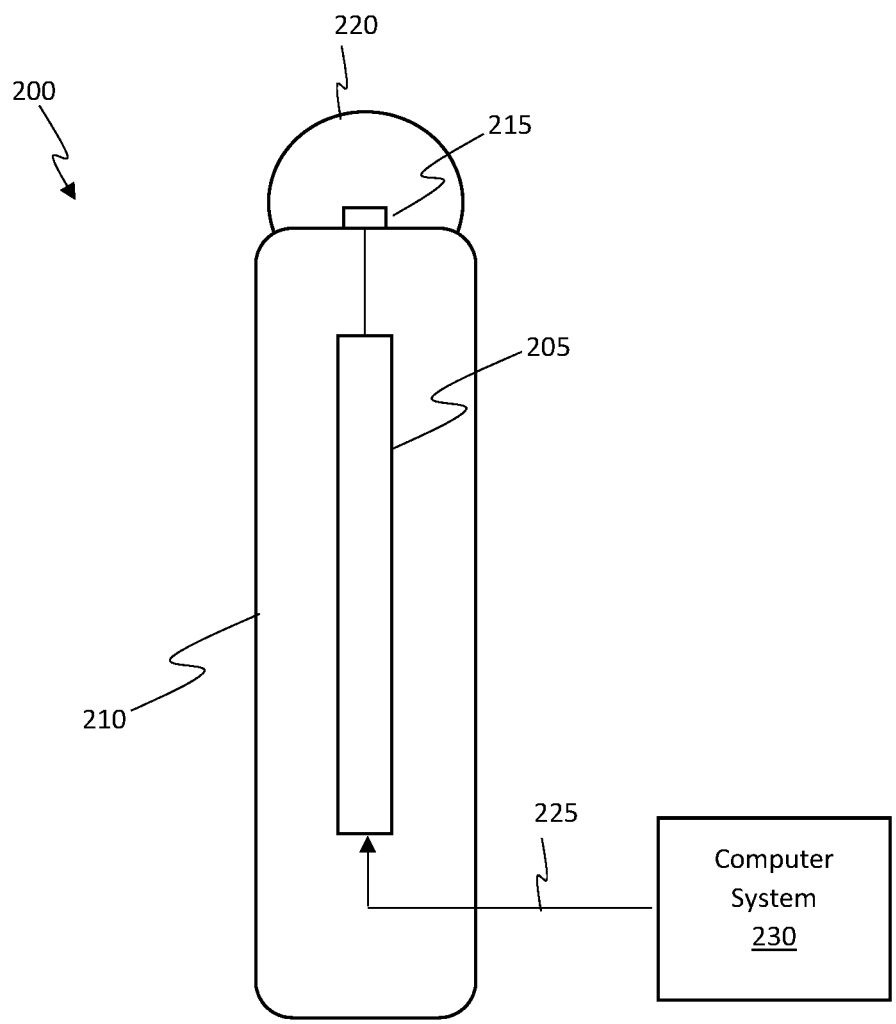
FIG. 2 depicts an exemplary electrical illumination device for emitting light to indicate the status of an agent and/or workstation of a contact center according to embodiments of the present invention.

With regard to FIG. 2, an exemplary electrical illumination (e.g., LED) device 200 for emitting light to indicate the status of an agent and/or workstation of a contact center is depicted according to embodiments of the present invention. The illumination device 200 includes a circuit board including circuitry 205 for controlling an illumination element (e.g., LED) 215. The circuitry can control the LED 215 to selectively turn the LED 215 on and off and control the color of light emitted by the LED 215. For example, according to some embodiments the circuitry 205 can cause LED 215 to blink, strobe, display a pattern of light, emit light for a predetermined period of time, change color, change intensity, emit a color gradient (e.g., fade from red to green), etc. The circuitry 205 is disposed in a casing 210 to house and protect the circuitry 205, and includes a transparent or semi-transparent LED cover or lens 220 that can be illuminated by the LED 215 and/or diffuse the light produced by LED 215. Of course, LED is only one example of a light source and many other well-known suitable light sources can also be employed.

The circuitry 205 is connected to a computer system 230 using a communication interface or port 225 such as USB, although any interface well-known in the art can be included, and the illumination device 200 receives power over the communication interface 225. Using communication port 225, the LED device 200 receives control signals from a computer system that causes circuitry 205 to control (e.g., activate, modify, adjust) the behavior of illumination element 215 by causing the circuit 205 to enter different operational modes. The control signals received over communication port 225 can cause the LED 215 to produce lighting effects responsive to an event or status associated with an agent or workstation of a contact center. According to some embodiments, circuitry 205 controls the behavior of illumination element 215 responsive to control signals received over communication port 225 based on predetermined thresholds, performance metrics, or more code numbers. The thresholds and metrics can be defined and customized using a monitor or supervisor computer system, for example. Based on the color and/or effect produced by the electronic illumination device 200, real-time status information of the computer system 230 is conveniently and efficiently obtained in response to viewing the illuminated electronic devices 200 without having to access a separate device or user interface.

Figure 3:
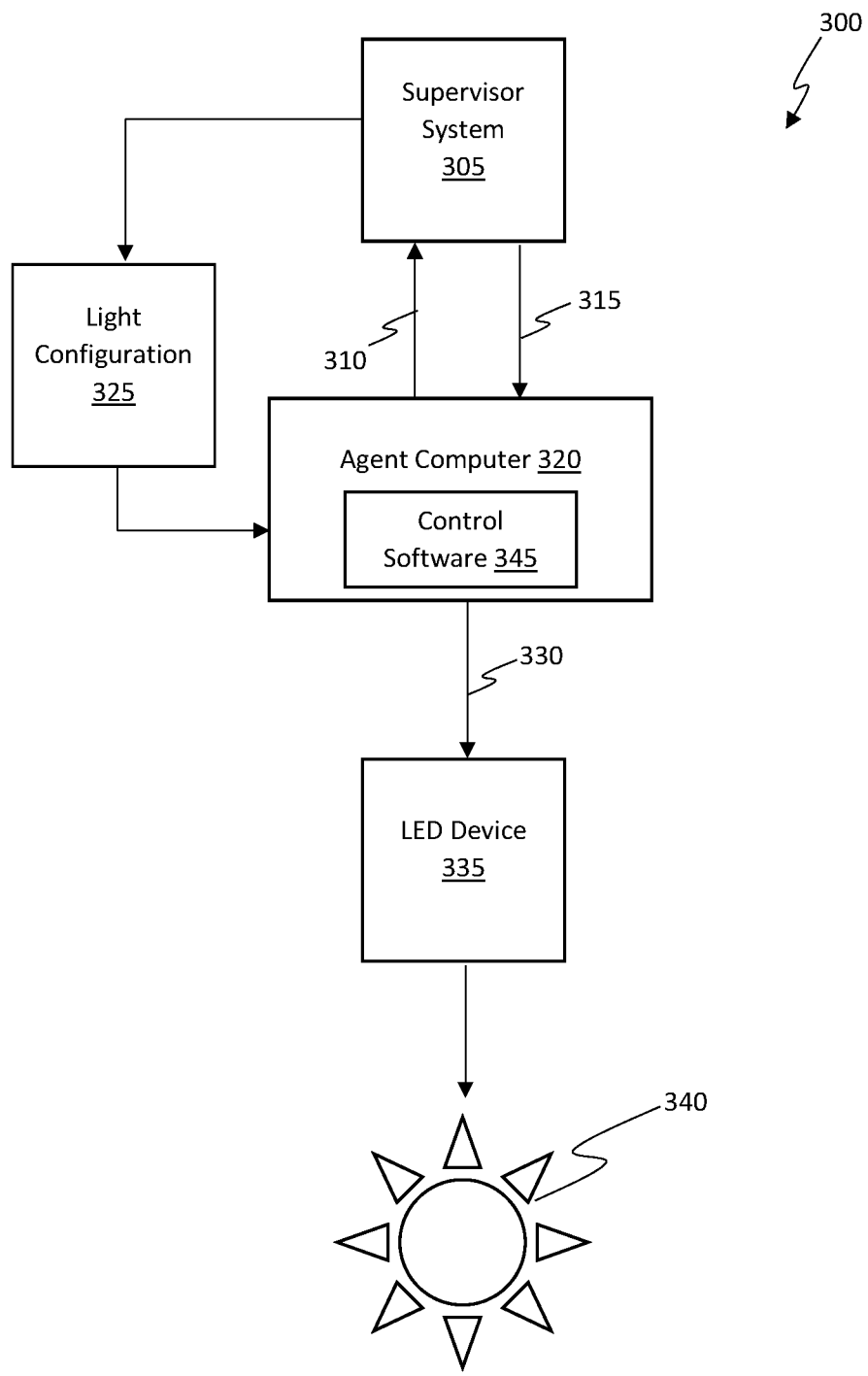
FIG. 3 depicts an exemplary block diagram and data flow diagram depicting a computer system for automatically indicating the status of an agent and/or workstation of a contact center according to embodiments of the present invention.

With regard to FIG. 3, an exemplary block diagram and data flow diagram 300 of a computer system for automatically indicating the status of an agent and/or workstation of a contact center is depicted according to embodiments of the present invention. A supervisor computer system receives data 305 from agent computer system 320 over a communication interface 310 such as a local area network or the Internet. The data received can include performance metrics of an agent, the current status of the agent, the status or availability of a workstation, etc. The supervisor system 305 can also send data and control signals 315 to agent computer system 320 to cause the illumination device 335 to controllably emit light 340 based on prescribed events and situations. The agent computer system 320 executes control software 345 to send control signals to illumination device 335 over a communication interface 330, such as USB or Bluetooth. The data 315 sent by the supervisor system 305 and the data 330 sent by the agent computer system 320 can cause the illumination device 335 to turn off or on, change color, change modes, blink, strobe, change brightness, etc., for producing light output 340. For example, supervisor system 305 can send data to the agent computer system 320, and the control software 345 executing on the agent computer system 320 sends corresponding control signals to the illumination device 335 for producing a desired lighting effect 340. Based on the lighting effect 340, real-time status information associated with agent computer system 320 is conveniently and efficiently obtained in response to viewing the illuminated electronic the lighting effect 340 without having to access a separate device or user interface.

According to some embodiments, data 315 includes an information request sent from supervisor computer system 305 to agent computer system 320. The information request can relate to performance metrics of an agent, the current status of the agent, the availability or status of a workstation, etc. In response to the information request, real-time information is obtained from agent computer system 320 to satisfy the request. The information may include an indication of how long an agent has been logged into a computer system, what software the computer system is executing, how long the agent has been on hold, if the agent has not recently taken a break, the availability of a workstation, etc. The real-time information can displayed on a display device connected to supervisor computer 305 and/or can be used to control illumination device 335 for causing illumination device 335 to turn off or on, change color, change brightness, change modes, blink, strobe, etc., for producing light output 340.

Figure 4:
FIG. 4 depicts an exemplary light configuration for automatically controlling an illumination device to indicate information pertaining to the status of agents and/or workstations of a contact center according to embodiments of the present invention.

According to some embodiments, supervisor computer system 305 generates a memory resident light configuration file, table, or data structure 325 stored as a data structure in memory and for defining conditions which cause the illumination device 335 to emit light with pre-defined effects as depicted in table 400 (FIG. 4). Moreover, according to some embodiments, the light configuration file or table 325 can cause the illumination device 335 to emit light based on customizable conditions and customizable effects as depicted in table 500 (FIG. 5) and table 600 (FIG. 6). In one example, the light configuration file 325 is defined by the supervisor computer system 305 and causes software executed by the agent computer system 320 to control the illumination device 335 to turn blue for 10 minutes when the agent working at a station has worked for more than 4 hours without taking a break. In another example, the light configuration 325 defined by the supervisor computer system 305 causes software executed by the agent computer system 320 to instruct the illumination device 335 to blink orange for example for 2 minutes when the agent working at a station has been logged in for more than 8 hours.

According to some embodiments, the light configuration 325 includes a list of required software that agents are expected to run when working at a workstation. For example, the light configuration 325 can include criteria that indicates that the electronic illumination device 335 will emit a solid purple light for instance when all of the required software is currently being executed by an agent computer system 320. When not all of the required software is being executed by the agent computer system 320, the criteria of the light configuration 325 can indicate that the electronic illumination device 335 should produce a certain lighting effect 340. For example, the electronic illumination device 335 can blink or strobe at a speed relative to the number of required software applications that are not currently being executed. Moreover, according to some embodiments, the light configuration 325 can further include undesired software applications that will cause the electronic illumination device to blink or strobe more rapidly. For example, if the agent computer system 320 is running all of the required software application and is also running a game of solitaire, the electronic illumination device 335 will blink or strobe to indicate that an undesired application is being executed. According to some embodiments, the electronic illumination device 335 will blink or strobe more rapidly based on the number of undesired software applications currently being executed by the agent computer system 320.

With regard to FIG. 4, an exemplary light configuration data structure 400 for automatically controlling an illumination device to indicate information pertaining to the real-time status of agents and/or workstations of a contact center is depicted according to embodiments of the present invention. The light configuration data structure 400 is stored in memory and can include a series of entries for controlling the illumination device based on a status 405, a color 410, and/or an effect 415. The status 405 describes an event or status that triggers the illumination device to display light using color 410 and/or effect 415. Each agent computer can display the corresponding visual effect in response to a query sent by the supervisor computer for a current status of the agent.

In one example, a "hand raised" status indicates that an employee has requested assistance with a task such as satisfying a customer inquiry. When an agent requests assistance for example by selecting a "request assistance" button on a graphical user interface displayed on their workstation, the illumination device connected to their workstation will emit a solid red light for instance. When a floor supervisor acknowledges the request for assistance, for example, by selecting the agent's request for assistance on a graphical user interface, the illumination device coupled to the agent's workstation will emit a solid yellow light for instance. Thereafter, when the agent is assisted by the supervisor or assistance is no longer needed, the illumination device connected to the agent's workstation stops emitting light. In another example, when a workstation is available to be used by an agent, the illumination device connected to the workstation emits a solid green light. When the workstation becomes occupied, the illumination device stops emitting light. A blinking green light indicates that the workstation is occupied but locked by a user (e.g., during a break).

Figure 5:
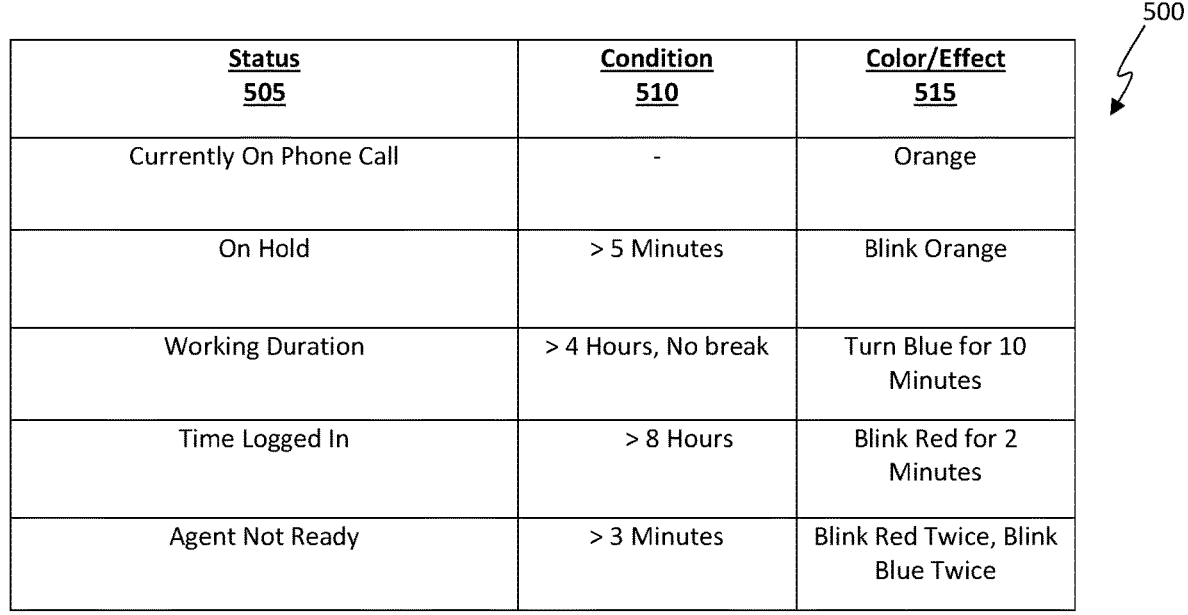
FIG. 5 depicts an exemplary light configuration for automatically controlling an illumination device to indicate information pertaining to the status of agents working at a contact center based on customizable conditions or thresholds according to embodiments of the present invention.
Figure 6:
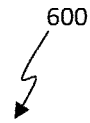
FIG. 6 depicts an exemplary light configuration for automatically controlling an illumination device to indicate information pertaining to customizable performance metrics for agents working at a contact center according to embodiments of the present invention.

With regard to FIG. 5, an exemplary light configuration 500 data structure for automatically controlling an illumination device to indicate information pertaining to the status of agents working at a contact center based on customizable conditions is depicted according to embodiments of the present invention. The status 505 describes an event or status that triggers the illumination device to display light when customizable condition 510 is met using customizable color/effect 515. The customizable condition 510 and customizable color/effect 515 can be defined by a supervisor of the contact center and provided to workstations of the contact center for controlling illumination devices according to the light configuration 500. The condition 510 and color/effect 515 are customizable so that any threshold (e.g., time threshold, quantity threshold, performance threshold) and color or colors can be used.

In one example, the light configuration 500 causes an illumination device connected to a workstation to turn orange for instance when the agent working at the workstation is engaged in a call or chat that is currently on hold. When the agent has been on hold for more than a predetermined period of time (e.g., 5 minutes), the illumination device blinks orange for instance. As another example, the illumination device connected to a workstation will turn blue for instance for 10 minutes when the agent working at the workstation has been working for more than 4 hours without taking a break. As another example, the illumination device connected to a workstation will blink red for 2 minutes for instance when the agent working at the workstation has been logged in for more than 4 hours without taking a break. As another example, the illumination device connected to a workstation will blink red twice and then blink blue twice for instance when the agent working at the workstation has logged in to the workstation but is not yet ready to begin working. Responsive to a supervisor query sent to all agents, the agent computers will automatically display their respective visual effects to reflect their real-time status.

With regard to FIG. 6, an exemplary light configuration data structure 600 for automatically controlling an illumination device to indicate information pertaining to customizable performance metrics or thresholds for agents working at a contact center is depicted according to embodiments of the present invention. The customizable condition 610 and customizable color/effect 615 can be defined by a supervisor of the contact center and provided to workstations of the contact center for controlling illumination devices according to the light configuration 600 depending on the real-time status of the workstations. The condition 610 and color/effect 615 are customizable so that any threshold (e.g., time threshold, quantity threshold, performance threshold) and color can be used.

In one example, software executed by a computer system of the contact center such as a server or supervisor computer system determines certain performance metrics related to the agents of the contact center, such as which agent has satisfied or completed the highest number of customer calls, chats, or inquiries. The software then sends a control signal to the workstation of the agent what has handled the highest number of calls to cause the illumination device connected to the agent's workstation to emit an orange strobe light, for example. As another example, the software can send a control signal to the workstation of the first agent to resolve a call at the contact center for a given day or time period to cause the illumination device connected to the agent's workstation to produce a multi-colored pattern or gradient. As another example, the software can send a control signal to the workstation of the agent with the highest customer satisfaction rating (e.g., based on customer satisfaction surveys) to cause the LED device connected to the agent's workstation to emit a blue strobe light. Based on the color and/or effect produced by the electronic illumination device, real-time status information across the contact center floor can be quickly obtained in response to viewing the illuminated electronic devices of the floor.

Figure 7:
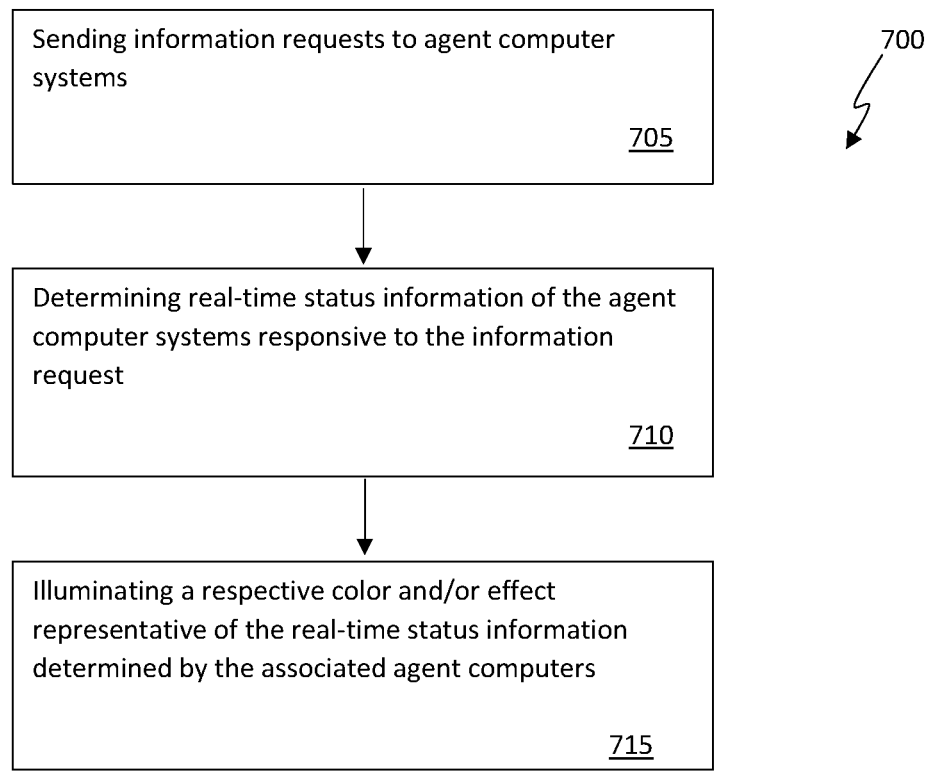
FIG. 7 depicts an exemplary sequence of computer-implemented steps for automatically controlling an illumination device to indicate real-time information (e.g., status or performance) of an agent and/or workstation of a contact center responsive to an information request or query according to embodiments of the present invention.

With regard to FIG. 7, an exemplary sequence of computer-implemented steps 700 for automatically controlling an electronic illumination device to indicate real-time information (e.g., status or performance) of agents and/or workstations of a contact center responsive to an information request or query is depicted according to embodiments of the present invention. At step 705, an information request is sent to the agent computer systems. The information request can include, for example, a request for how long an agent has been logged into a computer system, what software the computer system is executing, how long the agent has been on hold, if the agent has recently taken a break, the availability of a workstation, performance metrics, etc. At step 710, real-time status information is determined by the agent computer systems responsive to the information request. This may include all agents of the floor or just a single agent. At step 715, a respective color and/or effect representative of the real-time status information is produced by electronic illumination devices coupled to an agent computer system or from all agent computers on the floor. Based on the color and/or effect produced by the electronic illumination devices, real-time status information across the contact center can be readily obtained by a floor manager or supervisor in response to viewing the illuminated electronic devices.

Figure 8:
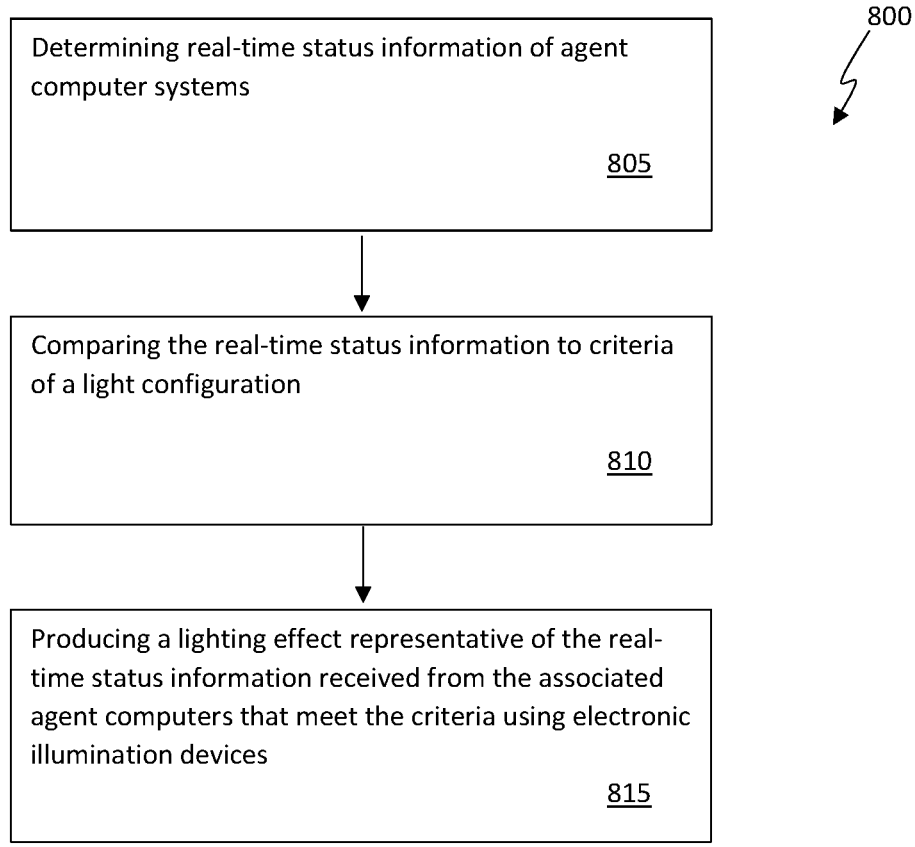
FIG. 8 depicts an exemplary sequence of computer-implemented steps for automatically controlling an illumination device to indicate that an agent of a contact center requires assistance according to embodiments of the present invention.

With regard to FIG. 8, an exemplary sequence of computer-implemented steps 800 for automatically controlling an illumination device to indicate the status of an agent of a contact center is depicted according to embodiments of the present invention. At step 805, real-time status information is determined by an agent computer system. The real-time status can indicate real-time performance or activity information associated with the agent, or indicate that a respective agent of a contact center requires assistance (e.g., hand raised). At step 810, the real-time status information determined in step 805 is compared to the criteria of a light configuration that may be stored in memory as a file or data structure. At step 815, a respective color (e.g., red) representative of the real-time status information determined by the associated agent computer system is illuminated using an electronic illumination device according to the criteria of the light configuration file. The real-time status information (e.g., hand raised) is conveniently and efficiently obtained across the contact center in response to viewing the illuminated electronic devices without requiring access to a separate device or user interface.

According to some embodiments, a function is performed includes providing assistance to agents requesting assistance based on the status information viewed. The function can further include selecting an agent to assist and clearing the hand raised status of the agent requesting assistance. Moreover, steps 800 can include changing the respective color (e.g., yellow) of the electronic illumination device responsive to the agent receiving assistance, or turning the electronic illumination device off.

Exemplary Computer System

Embodiments of the present invention are drawn to electronic systems for automatically controlling an illumination device to indicate information pertaining to workstations or agents of a customer contact center. Some embodiments are useful in the context of employee management to indicate information about tasks that employees are engaged in, the performance of the employees, and the status of an employee or workstation, using an illumination device. The following discussion describes one such exemplary electronic system or computer system can be used as a platform for implementing embodiments of the present invention.

Figure 9:
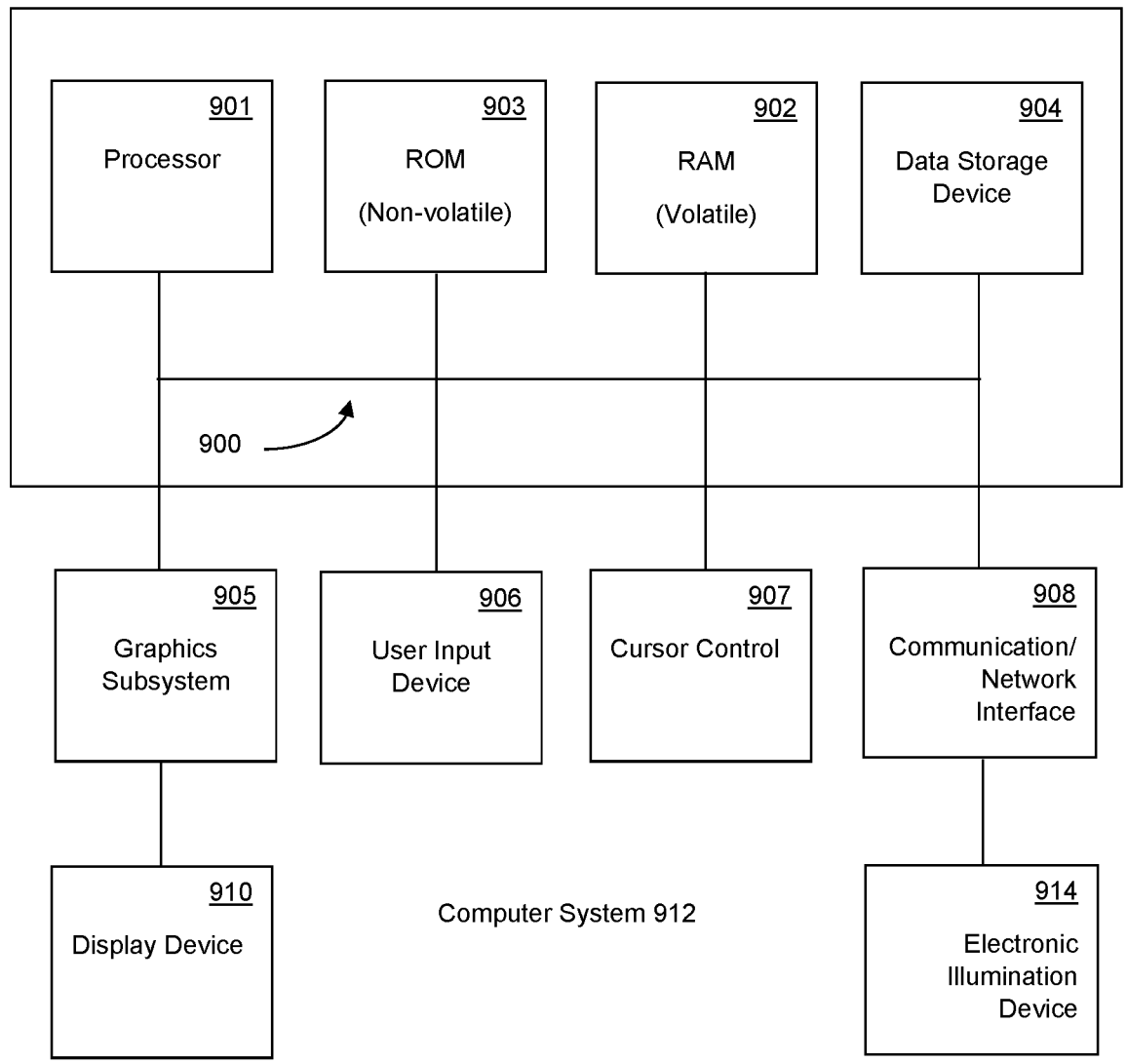
FIG. 9 depicts an exemplary computer platform upon which embodiments of the present invention may be implemented.

In the example of FIG. 9, the exemplary computer system 912 (e.g., an agent system or supervisor system) includes a central processing unit (CPU) 901 for running software applications and optionally an operating system. Random access memory 902 and read-only memory 903 store applications and data for use by the CPU 901. Data storage device 904 provides non-volatile storage for applications and data and may include fixed disk drives, removable disk drives, flash memory devices, and CD-ROM, DVD-ROM or other optical storage devices. The optional user inputs 906 and 907 comprise devices that communicate inputs from one or more users to the computer system 912 (e.g., mice, joysticks, cameras, touch screens, and/or microphones).

A communication or network interface 908 allows the computer system 912 to communicate with other computer systems, networks, or devices via an electronic communications network, including wired and/or wireless communication such as USB or Bluetooth, and including an Intranet or the Internet (e.g., 802.11 wireless standard). The optional display device 910 may be any device capable of displaying visual information in response to a signal from the computer system 912 and may include a flat panel touch sensitive display, for example. The components of the computer system 912, including the CPU 901, memory 902/903, data storage 904, user input devices 906, and graphics subsystem 905 may be coupled via one or more data buses 900.

In the embodiment of FIG. 9, an optional graphics subsystem 905 may be coupled with the data bus and the components of the computer system 912. The graphics system may comprise a physical graphics processing unit (GPU) 905 and graphics/video memory. GPU 905 may include one or more rasterizers, transformation engines, and geometry engines, and generates pixel data from rendering commands to create output images. The physical GPU 905 can be configured as multiple virtual GPUs that may be used in parallel (e.g., concurrently) by a number of applications or processes executing in parallel, or multiple physical GPUs may be used simultaneously. Graphics sub-system 905 outputs display data to optional display device 910. The display device 910 may be communicatively coupled to the graphics subsystem 905 using HDMI, DVI, DisplayPort, VGA, etc.

The communication or network interface 908 can be used to power and/or control an electronic illumination device 914 using the computer system 912 and to communicate with other computer systems, networks, or devices via an electronic communications network, including wired and/or wireless communication such as USB or Bluetooth, and including an Intranet or the Internet (e.g., 802.11 wireless standard). The communication or network interface 908 can also be used to receive and respond to information requests sent from a supervisor or monitor system, and the computer system 912 can control the electronic illumination device 914 responsive to the information request. Moreover, the computer system 912 can store light configuration files or data structures in memory (e.g., RAM 902) for defining conditions and effects used to control electronic illumination device 914. In this way, the electronic illumination device 914 can be advantageously used to indicate information (e.g., real-time status or activity) to a floor supervisor at a glance while the floor supervisor is monitoring the floor without having to access a separate device to view the content of graphical user interface.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. An electronic device comprising:
an electrical and physical interface operable to be coupled to a port of a computer system, wherein said computer system comprises a processor;
a rod-shaped casing housing said interface;
a circuit board comprising circuitry housed within said casing, wherein said circuitry receives control signals from the computer system over the interface and controls an illumination element; and
the illumination element disposed on one end of the rod shaped-casing and operable to produce a color that corresponds to a real-time status associated with said computer system, wherein said real-time status is determined by said processor and information read by said processor from said computer system,
wherein said computer system is operable to receive an information request from a remote monitor over a network interface, wherein said computer system obtains said real-time status responsive to said information request, and wherein further said circuitry controls said illumination element responsive to said information request.

2. The electronic device of claim 1, wherein said computer system receives a light configuration from the remote monitor, and wherein further said computer system sends control signals to said circuitry to control said illumination element based on said light configuration.

3. The electronic device of claim 2, wherein said light configuration comprises at least one of a status threshold and a performance threshold.

4. The electrical device as described in claim 1 wherein said real-time status represents a time duration of an agent logged into said computer system.

5. The electrical device as described in claim 1 wherein said real-time status represents an agent requesting assistance.

6. The electrical device as described in claim 1 wherein said real-time status represents a working time of an agent using said computer system.

7. The electrical device as described in claim 1 wherein said real-time status represents an agent using said computer system, and wherein said agent is logged in to said computer system but not working on said computer system.

8. The electrical device as described in claim 1 wherein said real-time status represents a software program executed by said computer system.

9. The electrical device as described in claim 1 wherein said illumination element rapidly changes said color to produce a lighting effect corresponding to the real-time status.

10. A method of monitoring contact center status among a plurality of agents of a contact center, the method comprising:
a remote monitor sending an information request to agent computer systems of the contact center, wherein said contact center comprises the plurality of agents, and wherein said agent computer systems comprise: a processor; a communication port; and an electronic illumination device;

responsive to receiving said information request, the agent computer systems of said plurality of agents determining real-time status information; and electronic illumination devices of the agent computer systems illuminating respective colors representative of respective real-time status information determined by the associated agent computer systems responsive to said information request, wherein each electronic illumination device comprises: an electrical and physical interface operable to be coupled a communication port of an associated agent computer system; a rod-shaped casing housing said electrical and physical interface; a circuit board comprising circuitry housed within said casing, wherein said circuitry receives control signals from the associated agent computer system over the interface and controls an illumination element; and the illumination element disposed on one end of the rod shaped-casing and operable to produce the respective colors representative of the real-time status information, wherein said real-time status information is determined by said processor and information read by said processor from said agent computer systems.

11. The method of claim 10 wherein said real-time status information comprises tasks currently performed by each agent.

12. The method of claim 10 wherein said real-time status information comprises an identity of a first agent, wherein the first agent has a highest performance level based on a prescribed metric.

13. The method of claim 10 wherein said real-time status information comprises productivity information for the agents.

14. A method of monitoring contact center status among a plurality of agents, the method comprising:

receiving an information request;

determining real-time status of agent computer systems associated with the plurality of agents in response to said information request, wherein the agent computer systems comprise a processor and a communication port; and based on the real-time status read from a light configuration to determine lighting effects that correspond to the real-time status, causing electronic illumination devices associated with the agent computer systems to produce the lighting effects reflective of the real-time status determined in response to said information request, wherein each electronic illumination device comprises: an electrical and physical interface operable to be coupled to a communication port of an agent computer system; a rod-shaped casing housing said interface; a circuit board comprising circuitry housed within said casing, wherein said circuitry receives control signals from the agent computer system over the interface and controls an illumination element; wherein the illumination element is disposed on one end of the rod shaped-casing and operable to produce lighting effects that correspond to the real-time statuses associated with the agent computer system.

15. The method of claim 14 wherein said real-time statuses indicate if a respective agent has requested assistance.

16. The method of claim 14 further comprising the electronic devices illuminating a new color when a respective agent no longer requires assistance.

17. The method of claim 14 wherein the agent computer systems further comprise a network interface, and further comprising the agent computer systems sending the real-time statuses to a remote monitor system using the network interface.

18. The method of claim 17 further comprising said remote monitor system selecting a first agent of the plurality of agents to receive assistance.

19. The method of claim 18 wherein a respective electronic illumination device associated with the first agent changes color responsive to being selected by the supervisor computer system.

\* \* \* \* \*